Patented Aug. 26, 1952

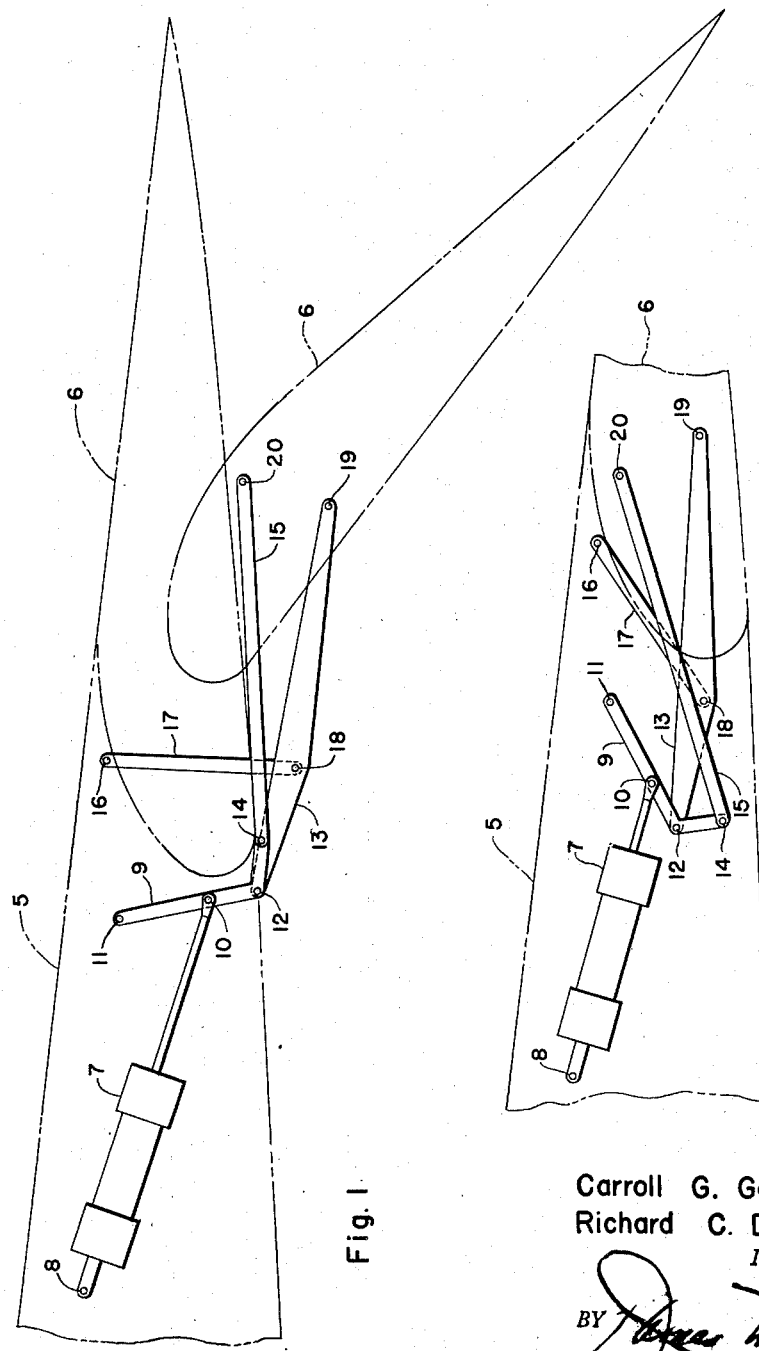

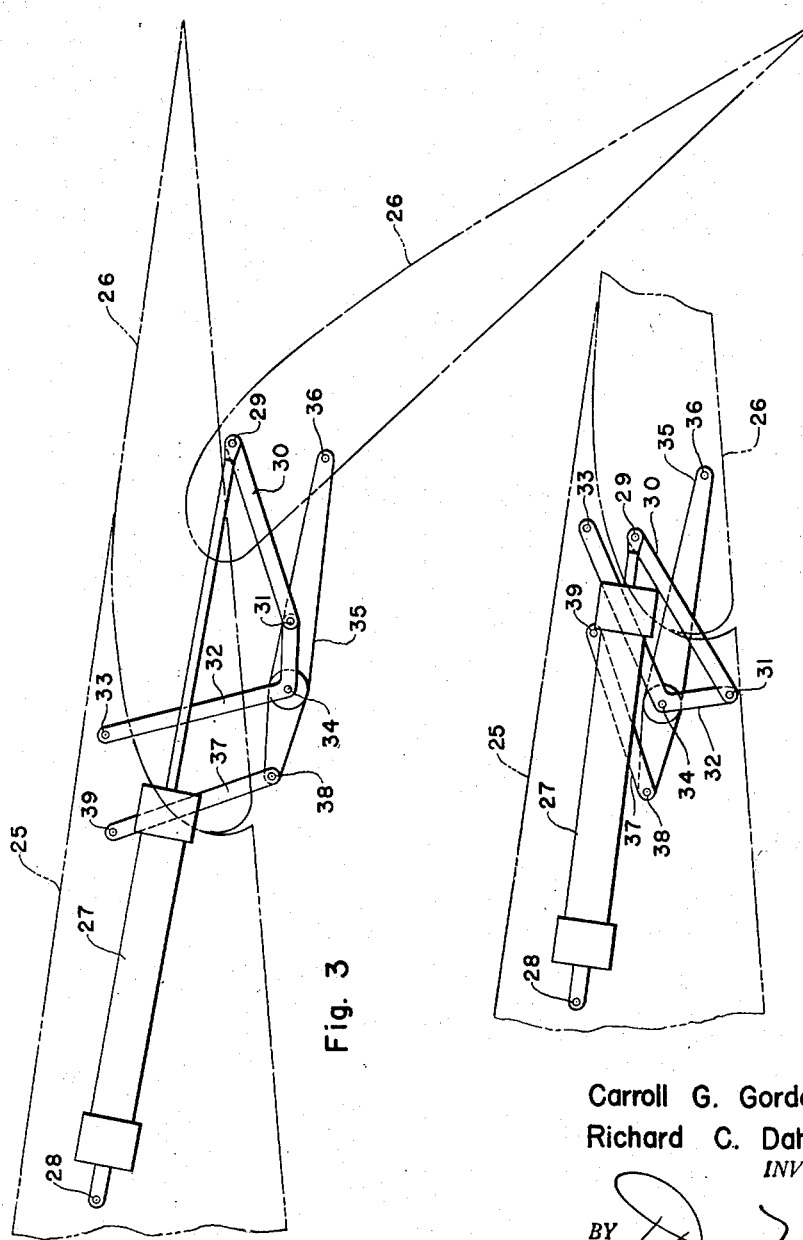

2,608,364

UNITED STATES PATENT OFFICE 2,608,364

WING FLAP MECHANISM

Carroll G. Gordon, Pasadena, and Richard C. Dahlman, Santa Monica, Calif., assignors to North American Aviation, Inc.

Application December 26, 1947, Serial No. 793,866

14 Claims. (Cl. 244—42)

The present invention relates to aircraft wings provided with trailing edge flaps and is more particularly concerned with improvements in the mounting, supporting and operating mechanisms for aircraft flaps.

The high-lift flaps of aircraft wings are normally provided with operating means of an irreversible mechanical, hydraulic or electric type, constantly under the control of the pilot through suitable control means in the aircraft cockpit such that these flaps may be extended downwardly and rearwardly to the desired extent and angle depending upon the prevailing flight condition. These trailing edge flaps are usually of the slot-forming type in order to provide efficient airflow characteristics over the main wing or airfoil while the flaps are in the extended operative positions, and during their retracted position the flaps preferably form a streamlined continuation of the main wing with a minimum of interruption to its upper and lower surfaces.

The advent of high-speed thin-wing aircraft, while maintaining and increasing the need for suitable high-lift flap devices for landing and take-off conditions, has presented numerous problems in the mounting arrangement of the flaps and the mechanism for extending and retracting the same. The present invention is directed to an improved pivotal type mounting and operating arrangement for trailing flaps in which the mechanism is particularly adapted for use within the trailing portions of relatively thin high-speed wings. The improved mechanism of the present invention is appreciably more compact than conventional mechanisms and is capable of moving the flap and rotating the same to the most ideal angle while housing the mechanism within a relative thin wing. This mounting and operating mechanism is such that the loads in all of the links of the mechanism are relatively lower than customary and do not change rapidly with changes in the flap position.

The present improved mechanism is also capable of being arranged such that the air loads will maintain a pressure or compression against the actuating motor (or the operating cylinder in hydraulically actuated installations) in all of the operating positions of the flaps. This mechanism is adapted for use with hydraulic, mechanical, electrical or other extensible actuating means and attains all of the desired results of track type mechanisms in respect to the long flap travel and rigidity of the mechanism in extended positions. A further improvement resides in the reduction of the operating loads against the actuating motor and in maintaining the same at moderate magnitudes.

It is accordingly a major object of the present invention to provide an improved wing flap mounting and operating mechanism of unusually compact arrangement adapted for use in relatively thin wings. It is a further object to provide such a mechanism which is capable of extending, rotating and retracting the wing flaps while maintaining the advantages of complete stowage of the mechanism within such relatively thin wings. A further object resides in the provision of a mounting and operating mechanism for flaps in which the loads in all of the links of the mechanism are relatively low and do not change rapidly with changes in the flap position. A still further object resides in the provision of such an improved mechanism wherein the air loads maintain compression against the actuating means or operating cylinder in each of the positions into which the flap is extended. A further object resides in an improved mechanism in which the operating loads against the actuating cylinder are maintained at relatively low values.

It is a further object to provide an improved actuating and mounting mechanism which is adapted for use with hydraulic, mechanical, electrical or other extensible actuating means. Another object of the present invention is to provide an arrangement which derives the advantage of permitting a flap travel equivalent to those heretofore obtained by track type flaps eliminating the weight disadvantage and the objectionable features of track type mechanisms under severe service conditions wherein a considerable amount of binding is frequently encountered. It is a still further object to provide an arrangement which is relatively stable at the extreme angles of flap deflection and to provide a rigidity substantially equal to that obtained in track type mechanisms.

Other objects and advantages of the present invention will become apparent to those skilled in the art after a reading of the following specification and the accompanying drawings forming a part hereof, in which:

Figure 1 is a diagrammatic view of one form of the present mounting and operating mechanism applied to a trailing edge flap shown in its extended position;

Figure 2 is a similar diagrammatic view showing the mechanism and flap of Figure 1 in its retracted position;

Figure 3 is a diagrammatic view of a modified form of the present mounting and operating mechanism shown in its extended position; and Figure 4 is a similar view of the mechanism of Figure 3 with the flap in its retracted position.

Referring now to Figures 1 and 2, the numeral 5 designates a relatively thin wing upon the trailing portion of which is movably mounted a slot-forming high-lift flap 6. This flap is actuated by a suitable hydraulic motor or strut 7, the cylinder portion of which is pivotally mounted upon the wing structure at 8 and the piston portion of the strut is pivotally attached at 10 to a lever member 9 having divergent arms terminating in pivotal connections 11 and 14. The lever 9 is pivotally attached to the wing structure at its upper terminal at the pivot 11, and in the region of the intersection of its divergent arms, the lever 9 is provided with a pivot 12 connecting with the forward terminal of the compound flap link 13.

The lever 9, at the terminal pivot 14 of its remaining divergent arm, is pivotally connected to a second flap link 15. Pivotally connected at 16 to the fixed wing structure 5, is a simple depending link 17 having a pivotal connection 18 to the intermediate portion of the lower flap link 13 just forward of the leading edge of the flap 6. The aft terminal of the lower flap link 13 is pivotally connected to the flap at the lower pivot 19 and the aft end of the upper flap link 15 is similarly pivotally connected to the flap at its upper pivot 20. It will be understood that the linkages shown in Figures 1 and 2, are diagrammatic and that in plan-view certain of the arms and links will be offset to facilitate clearance as the flap is extended and retracted.

Referring now to Figure 2, which shows the flap 6 in its retracted position in which it forms a streamlined continuation of the fixed wing 5, it will be noted that the actuating hydraulic motor 7 is contracted, having its piston portion drawn forwardly within the cylinder portion such that the pivotal connection 10 to the lever 9 has drawn the latter forward of its pivotal mounting to the fixed wing at 11. It will also be noted that the two flap links 13 and 15 pivotally connected to the flap 6 at 19 and 20, respectively, are crossed as they extend forward of the flap leading edge with the lower link 13 pivotally connected to the intermediate pivot 12 of the lever and with the normally upper flap link 15 pivotally connected at 14 to the offset terminal of the lever 9. The depending link 17 pivotally connected to the fixed wing 5 at the pivot 16 has its lower pivotal connection 18 to the lower flap link 13 drawn forwardly and upwardly due to retraction of the hydraulic motor 7 such that the link 17 extends downwardly and forwardly at a generally similar angle or co-directional to that of the upper arm portion of the lever 9 between its pivots 11 and 12.

The operation of the flap of Figures 1 and 2 is as follows:

As the piston portion of the actuating motor 7 is extended rearwardly, the lever 9 is rotated in a counterclockwise direction about its pivot 11. As the lever continues to rotate, its lower pivotal connection 14 moves past the lower flap link 13 and due to its rearward and upward movement pushes the upper flap link 15 and the flap 6, through its pivotal connection 20, rearwardly and downwardly. At the same time, the concurrent counterclockwise rotation of the pivot 12 of the lever causes the lower flap link 13 to be extended rearwardly and downwardly, with the flap 6 being similarly moved through a downward and rearward path controlled by the upper and lower flap links 15 and 13, and the effect of the depending link 17 which is also partially rotated in a counterclockwise direction about its upper pivot terminal 16, by virtue of its pivotal connection 18 to the lower flap link 13.

The flap 6 may be extended to any desired extent and can be locked in such extended position by either hydraulically locking the actuating strut 7 or providing a suitable mechanical lock (not shown). By means of the described mechanism, a travel equivalent to that of a track type flap is obtained while at the same time eliminating the weight disadvantages and the objectionable features of track type mechanisms under service conditions where a considerable amount of binding and jamming is frequently encountered. The presently disclosed arrangement is stable, even at its maximum angle of flap extension, and provides a rigidity which is equal to that obtained in track type mechanisms. In order to retract the flap 6, the actuating strut 7 is contracted, the piston portion is drawn forwardly, the lever member 9 and the depending link 7 are each rotated in the clockwise direction about their respective pivots 11 and 16, the flap links 13 and 15 are again crossed and the flap is drawn upwardly and forwardly into the recess provided in the trailing portion of the fixed wing 5. The preferred modification shown in Figures 1 and 2, accomplishes the result of efficient flap actuation and mounting with a flap travel of adequate distance by means of a hydraulic actuating cylinder 7 of small dimensions and relatively short stroke, providing a very compact installation.

The modification of flap mounting and actuating mechanism shown in Figures 3 and 4, is one in which the use of a longer stroke hydraulic motor is permitted. In this figure, the fixed wing portion is designated by the numeral 25 and the slot forming high-lift flap by the numeral 26. The substantially longer stroke hydraulic actuating cylinder 27 is pivotally connected to the fixed wing structure at its forward end at the pivot 28 and its piston portion is pivotally connected at 29 directly to the flap 26. A link 30 is pivotally connected at its upper outer terminal to the upper flap pivot 29 and is pivotally connected at its lower forward terminal by the pivot 31 to the lower terminal of the lever member 32. The upper terminal of the lever 32 is pivotally connected to the fixed wing structure 25 at the pivot 33, and the intermediate pivot 34 in the region of the junction of the two lever arms is pivotally connected to the flap link 35 somewhat forward of the flap leading edge. The flap link 35 is pivotally connected at its rearward terminal to the flap 26 at the lower pivot 36 and is provided with a pivotal connection 38 at its forward terminal to the depending link 37. This depending link 37 is pivotally connected at its upper terminal to the fixed wing structure 25 by means of the pivot 39. In the retracted position of the flap 26 as shown in Figure 4, the contraction of the actuating strut 27 and the drawing of the piston portion forwardly causes each of the links 30 and 37, as well as the upper arm of the lever member 32, to extend forwardly and downwardly in substantially similar directions. The contraction of the actuating strut 27 also causes the flap link 35 to extend upwardly and forwardly substantially parallel to the upper surface of the wing. The connection at 29 is primarily a positioning means, whereas the connection at 36 serves to carry the major portion of the load.

The operation of the flap mounting and actuating mechanism of the modification shown in Figures 3 and 4 is as follows:

As the piston portion of the actuating strut is extended rearwardly from the retracted position shown in Figure 4, the pivot 29 serves to pull the link 30 and the lever 32 rearwardly while the flap 26 is moved concurrently in the same direction. This rearward movement of the lever 32 and the flap link 35 imparts counterclockwise rotation to the lever, and the depending link 37, about their upper pivotal connections 33 and 39, respectively. Such counterclockwise rotation of the lever 32 and the link 37 causes the forward portion of the flap link 35 to be depressed toward and beneath the lower surface of the wing 25, and the flap 26 is concurrently rotated into an angle which approaches that shown in Figure 3. As the extension of the piston portion of the actuating strut 27 continues rearwardly, the actuating linkage and mounting mechanism gradually assumes the position shown in Figure 3, in which the flap link 35 is still substantially parallel to the upper surface of the fixed wing 25 but has now been depressed bodily beneath the lower surface thereof. The upper arm of the lever 32 and the depending link 37 have now been rotated beyond their vertical positions in which their lower pivotal terminals are also disposed beneath the lower surface of the fixed wing 25; and the link 30 interconnecting the flap pivot 29 with the offset terminal pivot 31 of the lever 32 has been slightly flattened in its disposition and has also been moved to a position slightly beneath the lower surface of the wing and in which it extends through the lower surface of the flap. As in the case of the previously described modification, contraction of the actuating cylinder 27 will serve to rotate the flap into alignment with the fixed wing portion while moving the same upwardly and forwardly to restore the flap and its associated actuating and mounting mechanism into the compact retracted position shown in Figure 4.

While in the modifications shown and described, a hydraulic actuating motor or strut has been illustrated, it will be obvious to those skilled in the art that mechanical, electrical or other suitable extensible devices may be substituted for the hydraulic struts which have been shown, and such other devices are capable of equally satisfactory results with applicants' improved mounting and actuating mechanism. Other forms and modifications of the present invention both as to its general arrangement and details, which may become obvious to those versed in the art, after a reading of the foregoing specification in the like of the accompanying drawings, are all intended to come within the scope and spirit of the present invention as more particularly defined by the appended claims.

We claim:

1. The combination with an aircraft wing, of a flap movably associated with the trailing portion of said wing, a lever having divergent arms pivotally mounted upon said wing at an upper terminal of a longer of its arms, first and second links each pivotally mounted respectively upon separate upper and lower pivots on said flap, the first of said flap links pivotally connected to a terminal of a shorter arm of said lever, the second of said flap links pivotally connected to said lever in the region of the intersection of its divergent arms, a depending link pivotally supported from said wing and pivotally connected to an intermediate portion of said second flap link, and means for rotating said lever about its pivotal connection to said wing for the rearward and downward extension of said flap with respect to said wing.

2. In a wing having a trailing edge flap, upper and lower pivots on said flap spaced both vertically and in the chordwise direction, first and second elongated flap links respectively connected to said upper and lower flap pivots and extending forwardly of the leading edge of said flap, the forward terminals of said flap links each pivotally mounted upon separate pivots upon a short arm of a lever having divergent arms pivotally mounted at the terminal of its longer arm to the fixed wing structure, further link means pivotally interconnecting the fixed wind structure with an intermediate pivotal connection on the second of said flap links, the shorter arm of said lever extending downwardly in the normal aligned position of said flap with the wing structure such that the forward terminal of said first flap link is disposed below the forward terminal of said second flap link, and means for imparting rotation to said lever for the rearward and downward movement of said flap with respect to the fixed wing structure.

3. A mounting arrangement for a flap movably associated with the trailing edge of a relatively fixed wing comprising a lever member having arms of different length, said lever member pivotally mounted upon the fixed wing at an upper terminal of the longer of its arms and having a terminal of the shorter of its arms pivotally interconnected through an elongated link with an upper portion of said flap, a further flap link pivotally interconnecting an intermediate portion of said lever member with a pivotal connection disposed adjacent the lower surface of said flap rearwardly of and lower than said first flap pivot in the fully retracted position of said flap, a depending link pivotally interconnecting said fixed wing with an intermediate portion of said further flap link, and extensible actuating means operatively connected to the longer arm of said lever member for imparting rearward movement thereto about its pivotal connection to said fixed wing for the rearward and downward extension of said flap with respect to said fixed wing.

4. In aircraft, a relatively fixed wing, a flap movably associated with the trailing portion of said wing, a pivotal connection within the upper forward portion of the profile of said flap, a further pivotal connection on said flap toward the lower surface of said flap, a lever member having offset arms of different lengths pivotally connected to said fixed wing at an upper terminal of the longer of its arms, said lever member having a terminal of its remaining arm pivotally interconnected by a link member with the said upper pivotal connection on said flap, a depending link pivotally supported from said fixed wing and having a pivotal connection at its lower depending terminal, an elongated link pivotally interconnecting said depending link pivot with said lower pivot of said flap and pivotally interconnected at a portion forward of said depending link pivot to the intermediate portion of said lever in the fully retracted position of said flap member whereby rearward forces applied to said lever member initiate cooperative movements of said associated linkages to rotate said flap as it is extended rearwardly.

5. In aircraft, a relatively fixed wing, a movable flap associated with the trailing edge thereof, a pair of pivotal connections within the profile of said wing flap spaced apart in both the vertical and chordwise directions, an elongated link extending forwardly from said flap pivotally connected at its rearward terminal to the lowermost of said flap pivots, a depending link pivotally connected at its upper terminal to said fixed wing and pivotally connected to said elongated link, a depending member pivotally supported at an upper terminal to said wing and pivotally connected at a lower portion to said elongated link at a point spaced from said depending link, the said depending member having an off-set pivotal connection rearwardly off-set with respect to its first two said pivotal connections in the fully extended position of said flap and closer to the lower portion pivot thereof, a flap link pivotally interconnected between said offset pivotal connection of said depending member and the said upper flap pivot, and extensible actuating means supported from said fixed wing structure and pivotally interconnected to said depending member for imparting rearward movement to said flap while the same is caused to rotate through a predetermined path by the cooperative action of the elements interconnecting said flap pivots with said fixed wing pivots.

6. In aircraft, a relatively fixed wing, a flap movably associated with the trailing portion thereof, spaced upper and lower pivotal connections within the nose portion of said flap, an elongated link pivotally connected to the lower of said flap pivots extending forwardly of said flap leading edge, a link depending from said wing pivotally interconnecting an intermediate portion of said elongated flap link with the said fixed wing structure, a lever member pivotally interconnecting said fixed wing with a forward portion of said elongated flap link forwardly spaced from said first depending link pivot, said lever member having arm portions of different lengths and having a rearwardly offset pivotal connection at a rearward terminal of a shorter of its two arm portions, a link pivotally interconnecting said offset pivotal connection with the upper of said flap pivots, extensible actuating means supported upon said fixed wing and connected to said lever member for imparting rearward movement thereto during which the said depending link and said lever member extend substantially co-directionally in both the retracted and extended positions of said flap.

7. In aircraft wing construction, a flap suspension and actuating mechanism for a relatively fixed wing comprising a flap movably associated with the trailing portion of said fixed wing, an upwardly disposed first pivot connection on said flap, a second pivot connection on said flap disposed below said first flap pivot, a forwardly and downwardly extending first flap link pivotally connected to said first flap pivot at its upper rearward terminal in the normal aligned position of said flap, a second flap link pivotally connected to the second said flap pivot at its aft terminal and extending forwardly and horizontally in the normal aligned position of said flap, a lever member having angularly offset arm portions of different lengths, one of said arm portions extending upwardly and pivotally connected to said wing structure at its upper terminal and at its lower portion pivotally connected to the forward terminal of said second flap link, a depending link pivotally connected at its upper portion to said wing and at its second portion to a mid-portion of said lower flap link, the said lever member having its other arm portion rearwardly extending and pivotally connected to the forward terminal of said first flap link, and extensible actuating means operatively connected to the suspension mechanism for concurrently extending said flap rearwardly and downwardly while simultaneously rotating said flap through predetermined angles by the cooperative action of the flap suspension mechanism.

8. The combination with an aircraft wing, of a flap movably associated with the trailing portion of said wing, a lever member having angularly offset arm portions of different lengths, said lever member pivotally mounted upon said wing at an upper terminal of a longer of its arm portions, first and second links each pivotally mounted upon separate pivots on said flap, the first of said flap links pivotally connected to the free offset terminal of the shorter arm portion of said lever member, the second of said flap links pivotally connected to an intermediate portion of said lever member, a depending link pivotally supported from said wing and pivotally connected to an intermediate portion of said second flap link, and actuating means for rotating said lever member about its pivotal connection to said wing for the rearward and downward extension of said flap with respect to said wing.

9. In a wing structure having a trailing edge flap, suspension mechanism for said flap comprising separate pivots on said flap spaced both vertically and in the chordwise direction, first and second elongated flap links pivotally connected to said flap at said separate pivots, said flap links extending forwardly of the leading edge of said flap, a lever having angularly offset arms of different lengths, the forward terminals of said flap links each pivotally mounted upon separate pivots upon the short arm of said lever, said lever pivotally mounted upon the fixed wing structure at an upper terminal of its longer arm, further link means pivotally interconnecting the fixed wing structure with an intermediate pivotal connection on the second of said flap links, the shorter arm of said lever extending downwardly in the normal aligned position of said flap with respect to the wing structure in such manner that the forward terminal of said first flap link is disposed below and aft of the forward terminal of said second flap link, and actuating means operatively connected to said suspension mechanism for the rearward and downward movement of said flap with respect to the relatively fixed wing structure.

10. In aircraft, a mounting arrangement for a flap movably associated with the trailing edge of a relatively fixed wing comprising a lever member having divergent arms of different length, said lever member pivotally mounted upon the fixed wing at an upper terminal of an upwardly extending and the longer of its arms, said lever member having a terminal of a rearwardly extending and the shorter of its arms pivotally interconnected through an elongated link with an upper forward portion of said flap, a further flap link pivotally interconnecting an intermediate portion of said lever member in the region of the juncture of its divergent arms with a pivotal connection disposed adjacent the lower surface of said flap rearwardly of and lower than said first flap pivot in the fully retracted position of said flap, a depending link pivotally interconnecting said fixed wing with an intermediate portion of said further flap link, and extensible actuating means operatively connected to said lever member for imparting rearward movement thereto about its pivotal connection to said fixed wing for the rearward and downward extension of said flap with respect to said relatively fixed wing.

11. In an aircraft having a relatively fixed wing, supporting mechanism for a flap movably associated with the trailing portion of said wing comprising a lever member having offset arms of different lengths pivotally connected to said fixed wing at an upper terminal of an upwardly extending and the longer of its arms, a pivotal connection within the upper forward portion of the profile of said flap, a further pivotal connection on said flap rearwardly of said first pivotal connection in the fully retracted position of said flap and toward the lower surface of said flap, said lever member having a rearwardly extending terminal of its remaining arm pivotally interconnected by a link member with the said first upper forward pivotal connection on said flap, a depending link pivotally supported from said fixed wing at an upper terminal and having a pivotal connection at its lower depending terminal, an elongated link pivotally interconnecting said lower depending terminal pivot of said depending link with said further lower pivotal connection on said flap and pivotally interconnected at a portion forward of said depending link pivot to said lever member whereby rearward forces applied to said lever member initiate cooperative movements of said associated linkages to rotate said flap as it is extended rearwardly and downwardly.

12. In aircraft having a relatively fixed wing and a flap movably associated with the trailing edge thereof, suspension mechanism for said flap comprising a pair of pivotal connections within the profile of said flap spaced apart in both the vertical and chordwise directions, an elongated link extending forwardly from said flap pivotally connected at its rearward terminal to the lower aft-most of said flap pivotal connections, a depending link pivotally connected at its upper terminal to said fixed wing and pivotally connected to said elongated link at the lower terminal of said depending link, a depending member pivotally supported at an upper terminal to said fixed wing structure and pivotally connected at a lower portion to said elongated link at a point spaced from the pivotal connection of said depending link with said elongated link, the said depending member having an offset pivotal connection rearwardly and downwardly offset with respect to a line interconnecting its first two said pivotal connections, a flap link pivotally interconnected between said offset pivotal connection of said depending member and the said upper forward flap pivotal connection, and extensible actuating means supported from said fixed wing structure and operatively connected to said suspension mechanism for imparting rearward movement to said flap while the same is caused to rotate rearwardly and downwardly through a predetermined path by the cooperative action of the several link elements of said suspension mechanism interconnecting said flap pivots with said fixed wing pivots.

13. In aircraft, a relatively fixed wing structure, a flap movably associated with the trailing portion thereof, and flap suspension mechanism comprising spaced upper and lower pivotal connections within the nose portion of said flap, an elongated link pivotally connected to the lower of said flap pivots extending forwardly of said flap nose portion, a link depending from said wing structure pivotally interconnecting a portion of said elongated flap link forward of said flap nose portion with the said fixed wing structure, a three-pivot member having an intermediate pivot and its lower closer pivot offset from its upper more distant pivot, said member pivotally interconnecting said fixed wing structure with a portion of said elongated flap link forward of said flap nose portion by means of its upper and intermediate pivots, said member having said lower pivot offset rearwardly and downwardly, a link pivotally interconnecting said offset pivotal connection with the upper of said flap pivots, extensible actuating means supported within said fixed wing structure and connected to said flap suspension mechanism for imparting rearward and downward movements to said flap with respect to said relatively fixed wing.

14. In an aircraft wing, a flap suspension and actuating mechanism comprising a flap movably associated with the trailing portion of said wing, a forwardly and upwardly disposed first pivot connection on said flap in the retracted position of said flap with respect to said wing, a second pivot connection on said flap disposed below said first pivot connection in the retracted flap position, a forwardly extending first flap link pivotally connected to said first pivot connection, a forwardly extending second flap link pivotally connected to said second pivot connection, a lever having divergent arms pivotally connected in the region of the intersection of its arms to said second flap link, one of said arms extending upwardly and pivotally connected to said wing, the other of said arms extending rearwardly and pivotally connected to the forward terminal of said first flap link, a depending link pivotally connected at its upper portion to said wing and at its lower portion to said second flap link, and extensible actuating means operatively connected to the suspension mechanism for concurrently extending said flap rearwardly and downwardly from said retracted position and simultaneously rotating said flap through predetermined angles by the cooperative action of said flap suspension mechanism.

CARROLL G. GORDON.
RICHARD C. DAHLMAN.

REFERENCES CITED

The following references are of record in the file of this patent:

UNITED STATES PATENTS

| Number | Name | Date |
|---|---|---|
| 2,086,085 | Lachmann et al. | July 6, 1937 |
| 2,243,885 | Schweisch | June 3, 1941 |

FOREIGN PATENTS

| Number | Country | Date |
|---|---|---|
| 486,565 | Great Britain | June 7, 1938 |
| 849,073 | France | Aug. 7, 1939 |